(12) United States Patent
Weinstein et al.

(10) Patent No.: US 11,023,509 B1
(45) Date of Patent: Jun. 1, 2021

(54) SYSTEMS AND METHODS FOR GRANULARIZING COMPOUND NATURAL LANGUAGE QUERIES

(71) Applicant: SoundHound, Inc., Santa Clara, CA (US)

(72) Inventors: Jason Weinstein, Toronto (CA); Keyvan Mohajer, Los Gatos, CA (US)

(73) Assignee: SOUNDHOUND, INC., Santa Clara, CA (US)

( * ) Notice: Subject to any disclaimer, the term of this patent is extended or adjusted under 35 U.S.C. 154(b) by 92 days.

(21) Appl. No.: 16/226,372

(22) Filed: Dec. 19, 2018

(51) Int. Cl.
*G06F 16/33* (2019.01)
*G06F 16/338* (2019.01)
*G06N 5/04* (2006.01)

(52) U.S. Cl.
CPC ........ *G06F 16/3344* (2019.01); *G06F 16/338* (2019.01); *G06N 5/042* (2013.01); *G06N 5/046* (2013.01)

(58) Field of Classification Search
CPC ............................ G06F 16/3344; G06F 16/338
USPC ........................................................ 707/708
See application file for complete search history.

(56) References Cited

U.S. PATENT DOCUMENTS

| 6,377,953 | B1* | 4/2002 | Gawlick | G06F 16/258 |
| | | | | 707/701 |
| 10,031,968 | B2* | 7/2018 | Venkataraman | G06F 16/9535 |
| 2011/0238645 | A1* | 9/2011 | Zhang | G06F 16/3322 |
| | | | | 707/706 |
| 2014/0358733 | A1* | 12/2014 | Achuthan | H04M 1/72552 |
| | | | | 705/26.62 |
| 2015/0161139 | A1* | 6/2015 | Wang | G06F 16/24578 |
| | | | | 707/735 |
| 2015/0310094 | A1* | 10/2015 | Danielsson | G06F 9/445 |
| | | | | 707/713 |
| 2017/0097940 | A1* | 4/2017 | Panuganty | G06F 16/90324 |
| 2017/0124220 | A1* | 5/2017 | Krueger | G06F 16/2425 |
| 2017/0177710 | A1* | 6/2017 | Burlik | G01C 21/3667 |

\* cited by examiner

*Primary Examiner* — Shahid A Alam
(74) *Attorney, Agent, or Firm* — David R. Stevens; Stevens Law Group

(57) ABSTRACT

A method for processing a natural language query. The method includes receiving a text query, the query referring to a plurality of objects, attributes, qualifiers and other arguments and parsing the query to produce an argument tree representing the substance and structure of the query. The method also includes the capability to define qualifiers as being possibly projectable onto other arguments and indicate their direction of projectability and the capability to denote nodes of the argument tree as foldable, as splittable, or as containing sequences of qualifier arguments. The method additionally includes defining validity rules for a domain of knowledge, used to determine whether a list of arguments form a valid granular query component and processing of the argument tree, in view of the above in order to derive a corresponding plurality of granular query components that collectively request the plurality of pieces of information representing the intent of the query.

20 Claims, 15 Drawing Sheets

SYSTEMS AND METHODS FOR GRANULARIZING COMPOUND NATURAL LANGUAGE QUERIES

CROSS-REFERENCE TO RELATED APPLICATIONS

Not applicable.

BACKGROUND OF THE INVENTION

Natural language queries can be difficult to interpret, especially when they include multiple requests for information within a single query. Basic search engines simply treat each word as a text input and then attempt to find results which include every word. However, this rarely leads to the most relevant results and almost never leads to obtaining the actual information desired (instead it merely points a user to sources that may contain the information). Alternatively, these queries may be converted to simple text searches by eliminating common words, such as "a" or "the", but this rarely changes the results.

Because of these problems, there have been many attempts to deal with natural language queries by answering the question presented by the user. However, these can normally only deal with simple phrases and queries that require multiple answers are far beyond the scope of these simple attempts. For example, the query "what was the population of Japan in 1900 and 2000?" is beyond the scope of these rudimentary systems because there are two pieces of information requested (the population of Japan in 1900 and the population of Japan in 2000) but these are not straightforward text combinations present in the original query. Therefore, the result is not the two numbers desired, but instead, sources that include both numbers, forcing the user to spend extra time either reducing the query to multiple single requests for information or to go to the source and look for the information. Neither workaround is particularly desirable.

BRIEF SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a method for processing a natural language query. The method includes receiving a text query, the query referring to a plurality of objects, attributes, qualifiers and other arguments. The method further includes parsing the query to produce an argument tree representing the substance and structure of the query. The method also includes the capability to define qualifiers as being possibly projectable onto other arguments and indicate their direction of projectability. The method additionally includes the capability to denote nodes of the argument tree as foldable, meaning that the plurality of sub-branches belonging to that node should be joined together when determining the granular components of the query intent. The method further includes the capability to denote nodes of the argument tree as splittable, meaning that the plurality of sub-branches belonging to that node should be split into separate components when determining the granular components of the query intent. The method also includes the capability to denote nodes of the argument tree as containing sequences of qualifier arguments. The method additionally includes defining validity rules for a domain of knowledge, used to determine whether a list of arguments form a valid granular query component. The method moreover includes processing of the argument tree, in view of the substance and structure of the argument tree, the rules of validity, the foldable condition of each node, the splittable condition of each node, and whether each node consists of a sequence of qualifiers, in order to derive a corresponding plurality of granular query components that collectively request the plurality of pieces of information representing the intent of the query.

These and other objects and features of the present invention will become more fully apparent from the following description and appended claims or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1:
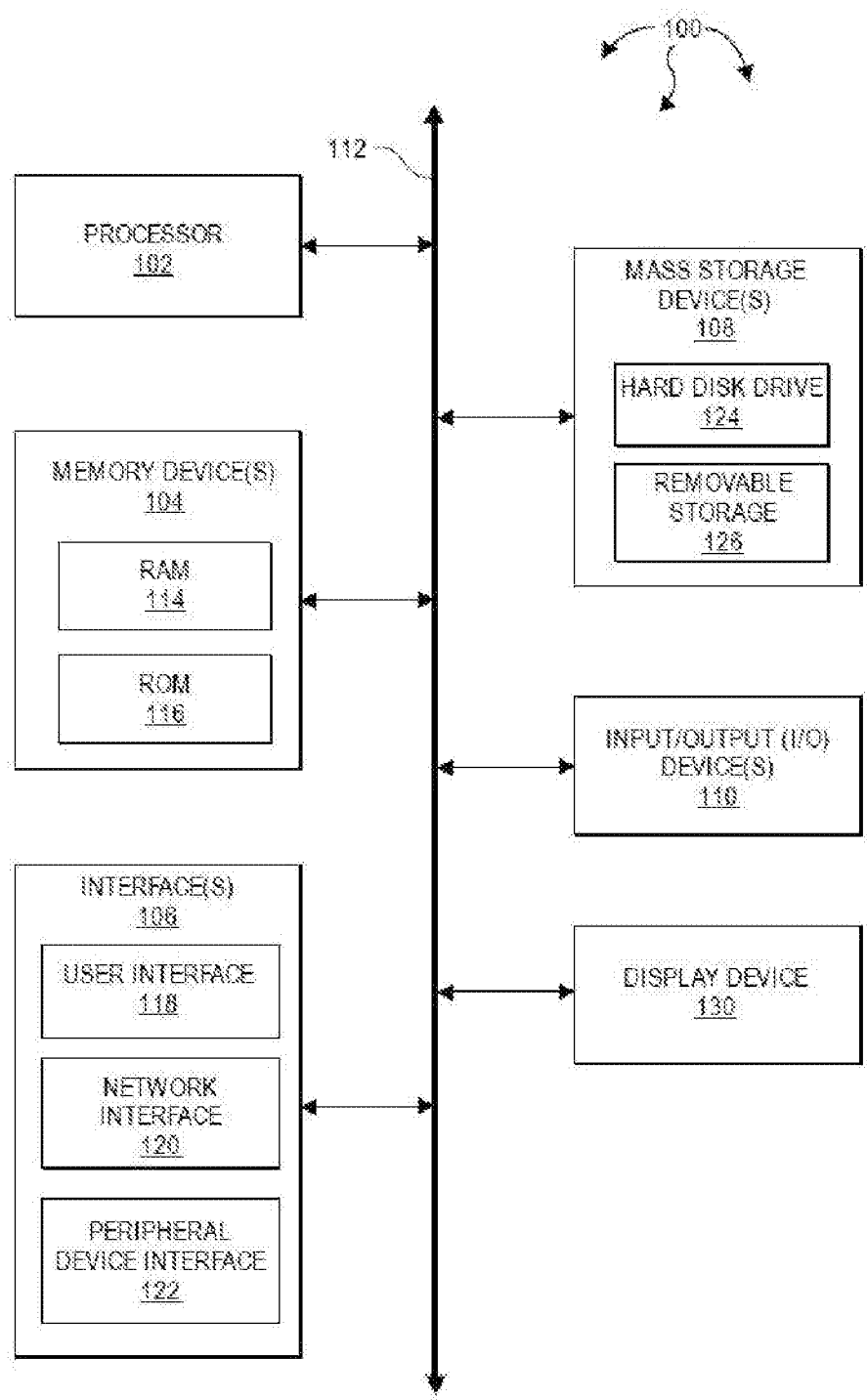
FIG. 1 illustrates an example block diagram of a computing device.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, radars, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2:
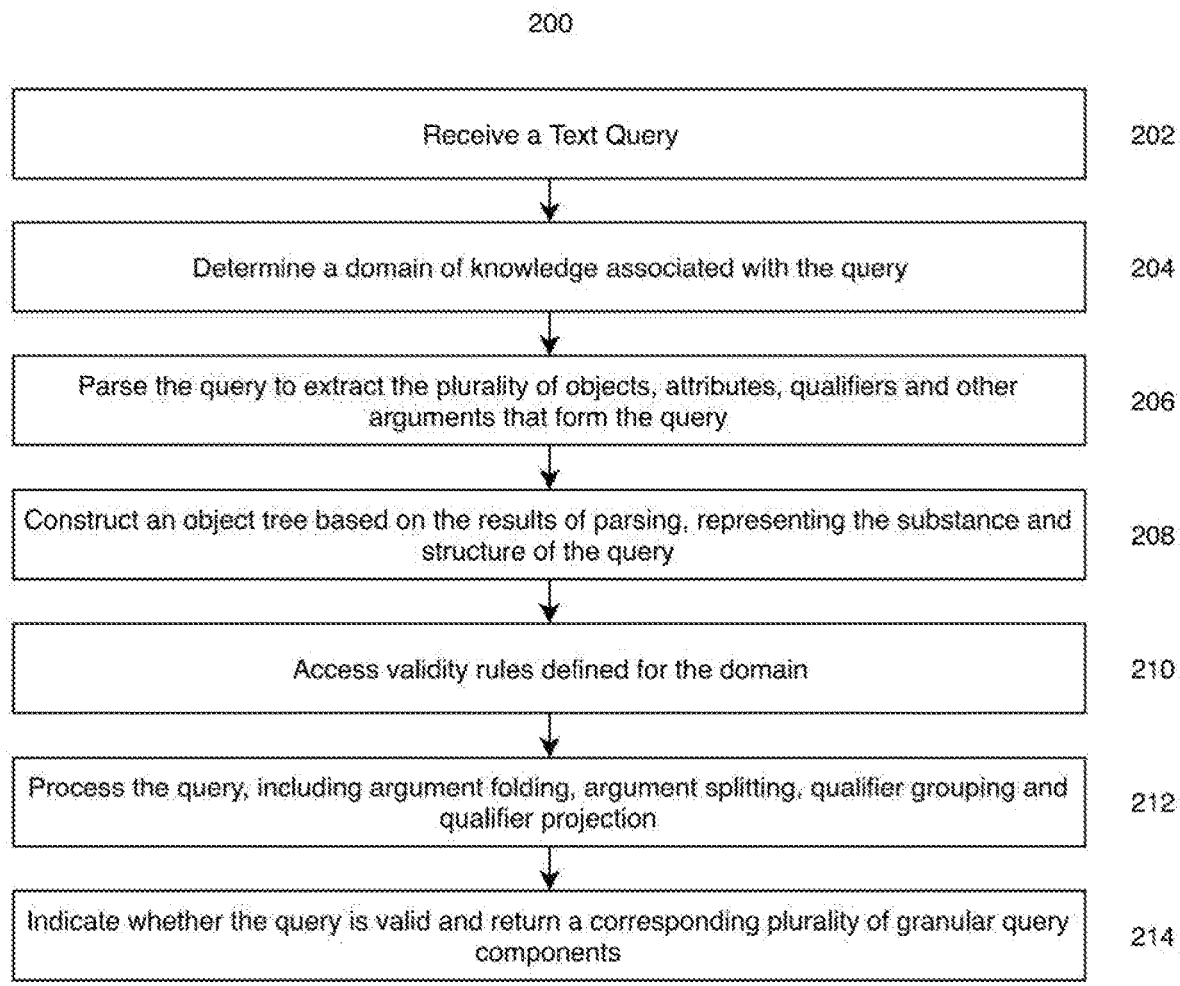
FIG. 2 is a flowchart illustrating an example of a method 200 for processing a natural language query.

FIG. 2 is a flowchart illustrating an example of a method 200 for processing a natural language query. Natural language queries can be difficult to interpret because words may have different meanings depending on their placement. I.e., straight text searches need only search for results which include each of the included words. However, natural language queries are more complex and can include multiple queries within a single phrase. Therefore, natural language queries must be processed in order to obtain one or more granular queries which can be performed.

The purpose of the framework is to produce the list of granular pieces of information requested in a natural language query. This is done based on the principles described below. The inputs to the framework are:
 1. A set of definitions for argument types that define the various data elements of which a query can be composed for a particular domain of knowledge
 2. Rules of validity that can be applied to a list of arguments of the defined types
 3. An argument tree representing the substance and structure of the query The first two items above are generally fixed, meaning that they do not vary from query to query. The third item varies from query to query.

And the outputs are:
 A Boolean value indicating whether the query is logically valid
 If the query is valid, then a 2-dimensional list of arguments corresponding to granular query components representing the intent of the query FIG. 2 shows that the method 200 can include receiving 202 a text query. The text query is a natural language query. I.e., the text query is received as an individual would speak or write normally, rather than a simple text search. In general, the query will refer to a plurality of arguments (e.g., objects, attributes, qualifiers and other arguments, which will be explained below). In addition, the text query may request a plurality of pieces of information. I.e., a single text query may be received 202 which returns multiple results. One of skill in the art will appreciate that there is no theoretical limit to the number of responses which are returned, as described below.

FIG. 2 also shows that the method 200 can include determining 204 a domain of knowledge associated with the query. The domain comprises phrasing and corresponding natural language understanding for a particular field of knowledge. For example, the domain can be a specific set of sports results (such as Olympic results) or any other data set which is to be searched.

In one embodiment, the system is specific to only one domain of knowledge, such that the domain is identified based on it being the only possibility.

In another embodiment, the system supports a plurality of domains of knowledge. For a given query, parsing is performed in parallel for each domain, and results for domains that don't produce valid results are excluded.

FIG. 2 further shows that the method 200 can include parsing 206 the query to extract the plurality of arguments that form the query. For example, in the query "what are the area and population of China and Japan in 2000?" "area" and "population" are attributes, "China" and "Japan" are objects, and "in 2000" is a qualifier. One of skill in the art will appreciate that these distinctions are sometimes arbitrary, but that does not necessarily affect the final results given to the user, as described below.

FIG. 2 moreover shows that the method 200 can include 208 constructing an argument tree based on the results of parsing. The argument tree represents the substance and structure of the query. It contains both the entity types and data found in the query text. Furthermore, each argument can be identified as having sub-arguments that are either foldable, splittable or a sequence of qualifier arguments. In the case of a foldable node, the plurality of sub-branches belonging to that node should be joined together in a folding operation when determining the granular components of the query intent, which will be described in more detail below. In the case of a splittable node, the plurality of sub-branches belonging to that node should be split into separate components when determining the granular components of the query intent. In the case of a sequence of qualifier arguments, grouping logic is used when determining the granular components of the query intent. Qualifier arguments can also be identified as projectable and given a direction of projectability (i.e., forward or backward). This allows qualifiers to be projected onto other arguments, such as other objects or attributes, provided certain conditions are met.

FIG. 2 further shows that the method 200 can include accessing 210 validity rules defined for the domain. The validity rules vary from domain to domain, depending on the types of queries a particular domain can support. For example, the validity rules are used to check whether a list of arguments forms a valid granular query component. In particular these rules can be used to check whether the arguments in the list conflict with each other and whether required arguments are present.

FIG. 2 also shows that the method 200 can include processing 212 the query. This functionality includes performing argument folding and splitting, executing grouping logic for lists of qualifiers, and projecting qualifiers onto other arguments. This functionality will be described in further detail below.

Figure 4:
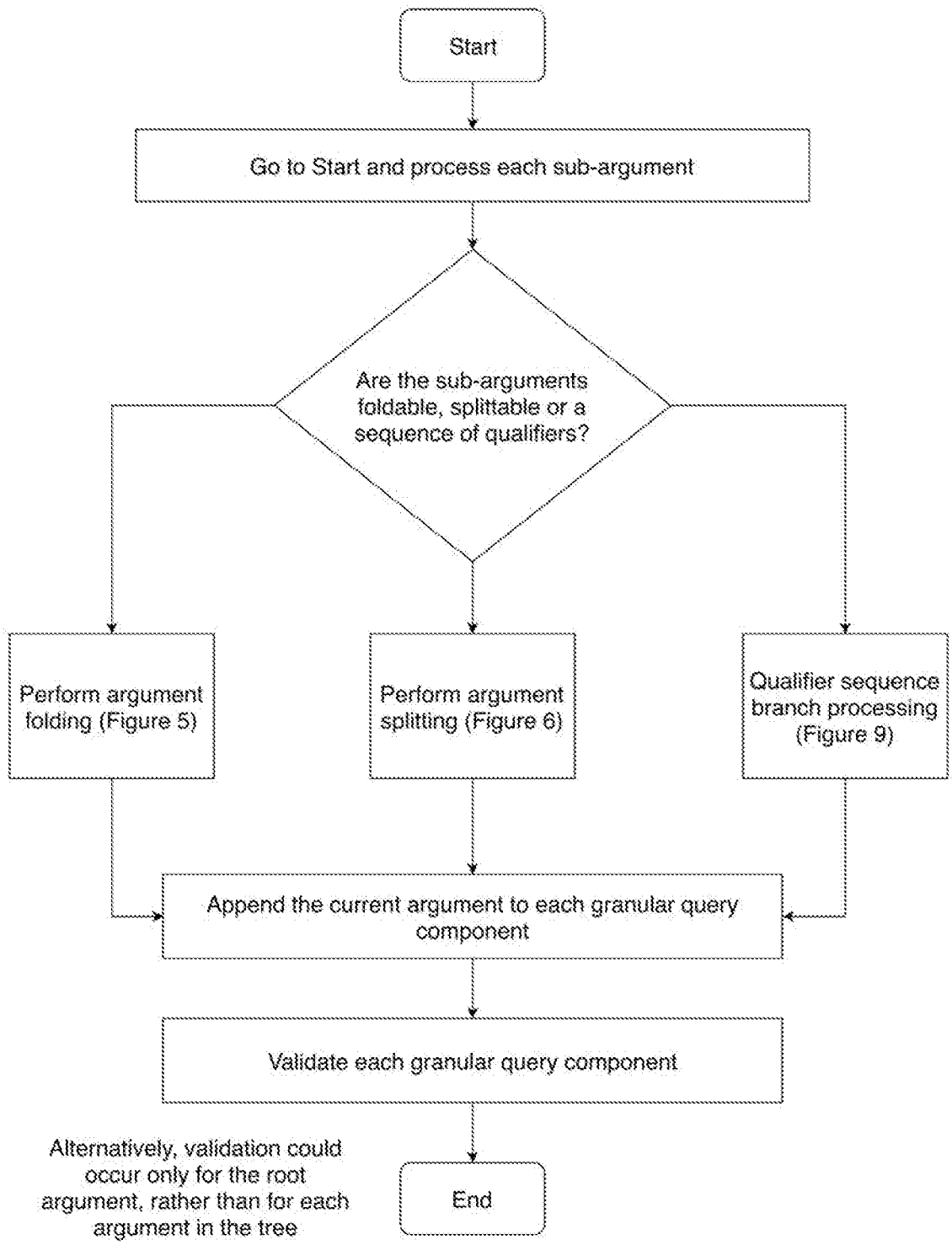
FIG. 4 illustrates a flowchart of an example algorithm performed on the argument tree to produce the granular query components.

FIG. 4 illustrates an overview of the algorithm for processing an argument tree. The process is called on the root argument of the argument tree. Query processing of the argument tree is performed using a depth-first search (DFS) algorithm. Before each argument itself is processed, its children are processed. Thus, processing is performed in a recursive manner.

Once an argument's children have been processed, processing on itself begins. The functionality that proceeds depends on whether the argument has been flagged as having
   foldable sub-arguments
   split sub-arguments
   sub-arguments that form a sequence of qualifiers
Each of these cases will be discussed below. If an argument does not have any sub-arguments, then any of the above should produce the same result. In one embodiment of this method, an argument is assumed to have foldable sub-arguments by default, as well as in cases where no sub-arguments are present. Each of these branches will be discussed in detail below.

After the sub-arguments have been processed, a set of granular query components is produced. Next, the current argument (or root argument, in the case of processing the root argument) itself as appended to each granular query component. In the special case where no granular components exist (e.g., there are no sub-arguments) then the current argument is added as a singleton to the list of granular components.

Finally, each granular query component is validated using the rules of validity for the domain. If any of the granular query components is found to be invalid (for example, having conflicting arguments or missing required arguments) then the entire query is deemed to be invalid. In this case, the parse can be rejected as being not understood.

Foldable Sub-Arguments

Figure 5:
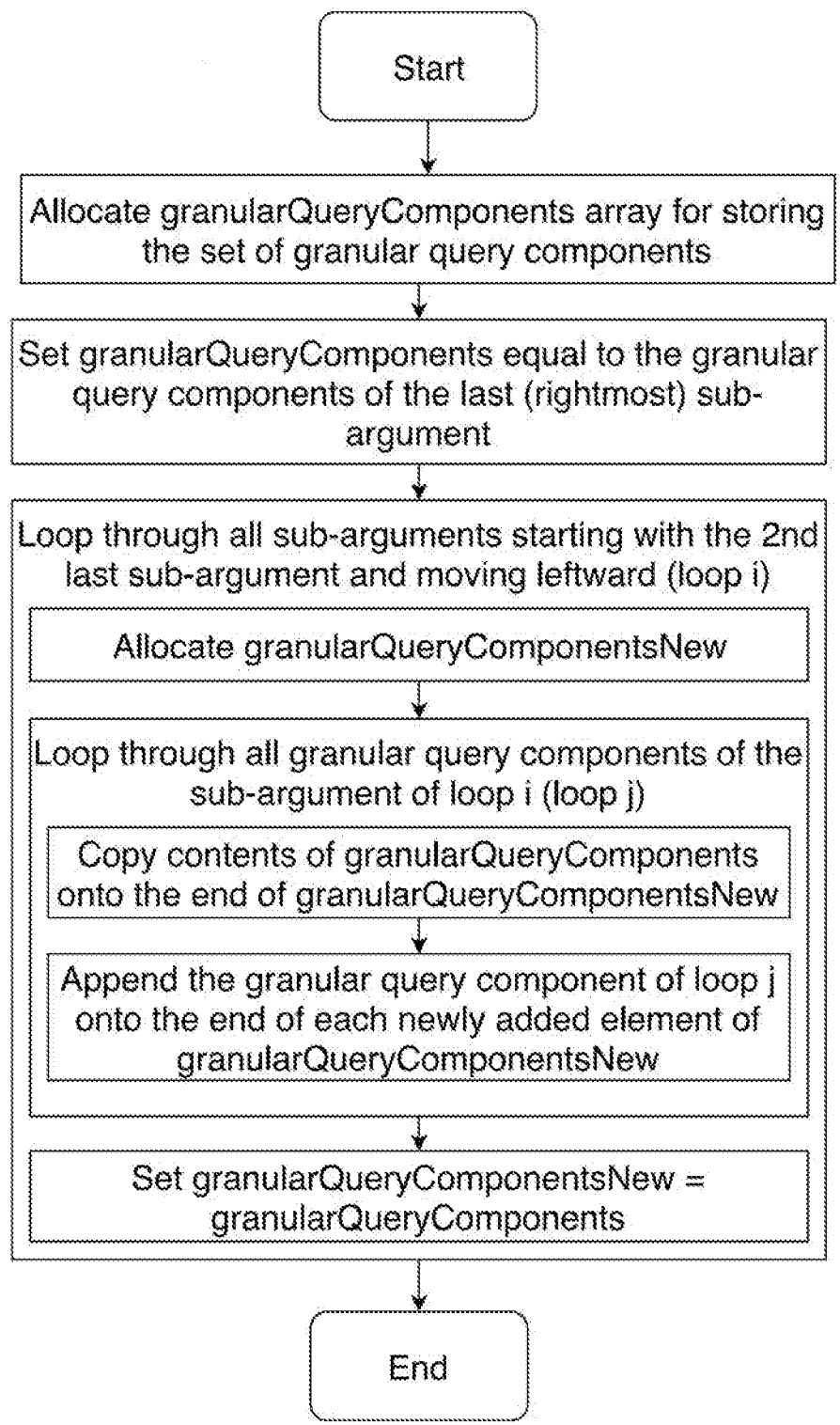
FIG. 5 illustrates a flowchart of an example algorithm for argument folding.

An example of an algorithm that implements the argument folding process is illustrated in FIG. 5. When an argument has been identified as having foldable sub-arguments, all of the sub-arguments will be folded together into a single track of granular components, along with the argument itself. This does not necessarily indicate that the current argument resolves into only one single granular component. If one or more of the sub-arguments have been resolved into multiple granular components, then this will be reflected in the list of granular components for the current argument.

The process of Argument Folding first involves taking the set of granular components of the last (rightmost) sub-argument. Then this set of granular components is augmented with each granular component corresponding to the next sub-argument to the left. If there were x sets of granular components for the last sub-argument and y sets of granular components for the second last sub-argument, then this will result in xy sets of granular components after processing these two sub-arguments. This process continues for all sub-arguments, moving leftward.

In another embodiment of the method, the argument folding process starts from the first (leftmost) argument and moves rightward.

This process is similar to calculating an n-ary Cartesian product on a set of sets. For arbitrarily complex queries, each element in a set $S_x$ can resolve to a 2-dimensional array of base arguments, itself produced by the process of FIG. 4. If the set of granular components for sub-argument x is denoted $S_x$ then the Argument Folding process on n sub-arguments will produce:

$$|S_1|*|S_2|*|S_3|* \ldots *|S_n|$$

granular query components.

To illustrate the argument folding process, suppose that argument $A_1$ has no sub-arguments. In this case the argument folding process yields the following 2-dimensional list of resulting granular components:
( )(an empty set)
In another example, suppose that argument $A_1$ has sub-arguments $B_1$, $B_2$ and $B_3$, which have been resolved as follows into their respective 2-dimensional lists of resulting granular components:
   $B_1$: (($B_1$))
   $B_2$: (($B_2$))
   $B_3$: (($B_3$))
Then the resulting set of granular query components would be:
(($B_1$, $B_2$, $B_3$))
In yet another example, suppose that argument $A_1$ has sub-arguments $B_1$, $B_2$ and $B_3$, which have been resolved as follows into their respective 2-dimensional lists of resulting granular components:
   $B_1$: (($B_1$, $C_1$, $C_2$), ($B_1$, $D_1$, $D_2$))
   $B_2$: (($B_2$, $E_1$), ($B_2$, $F_1$))
   $B_3$: (($B_3$))
Then the resulting set of granular query components would be:
(($B_1$, $C_1$, $C_2$, $B_2$, $E_1$, $B_3$), ($B_1$, $C_1$, $C_2$, $B_2$, $F_1$, $B_3$), ($B_1$, $D_1$, $D_2$, $B_2$, $E_1$), ($B_1$, $D_1$, $D_2$, $B_2$, $F_1$, $B_3$))

Splittable Sub-Arguments

Figure 6:
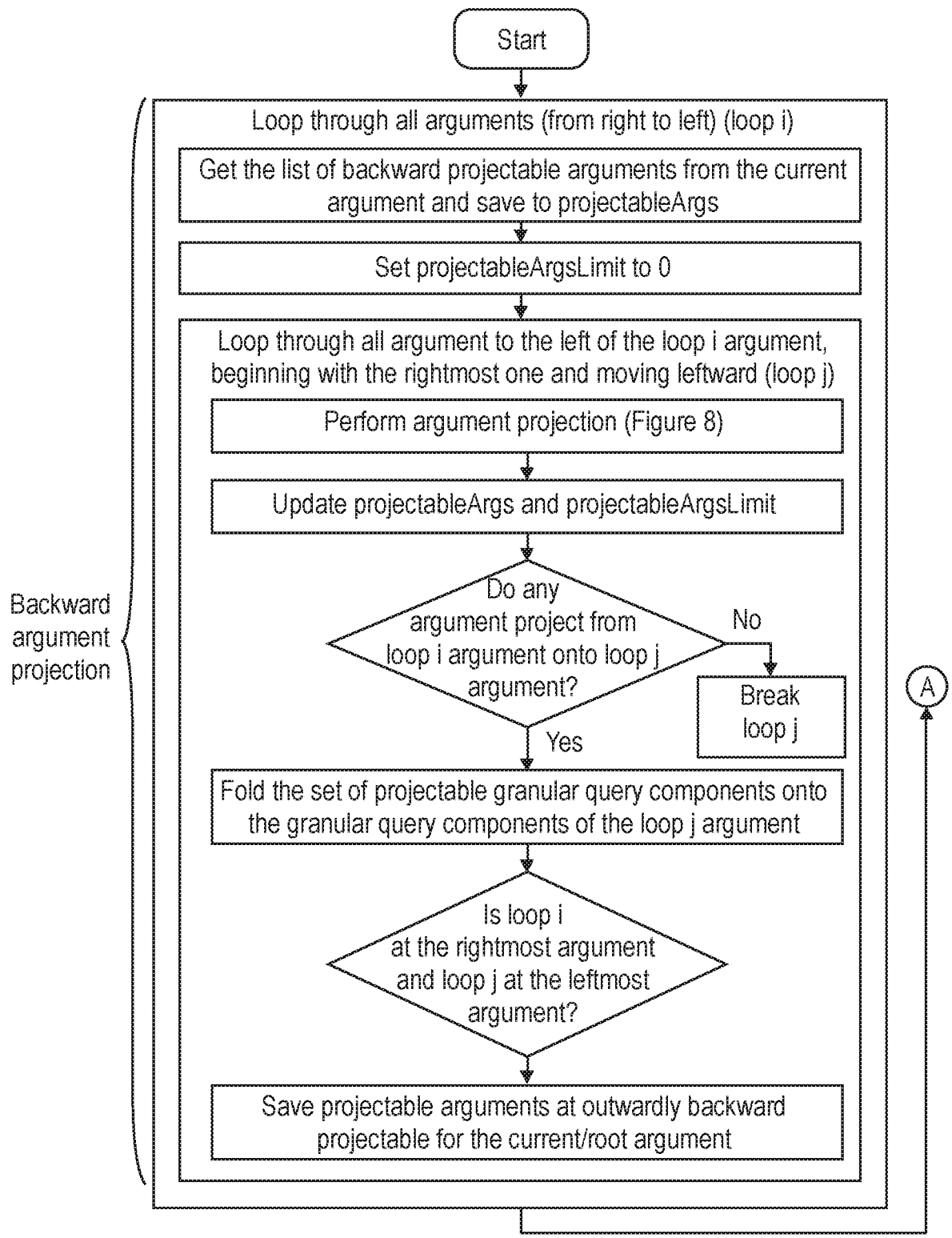
FIG. 6 illustrates a flowchart of an example algorithm for performing argument splitting.
Figure 6:
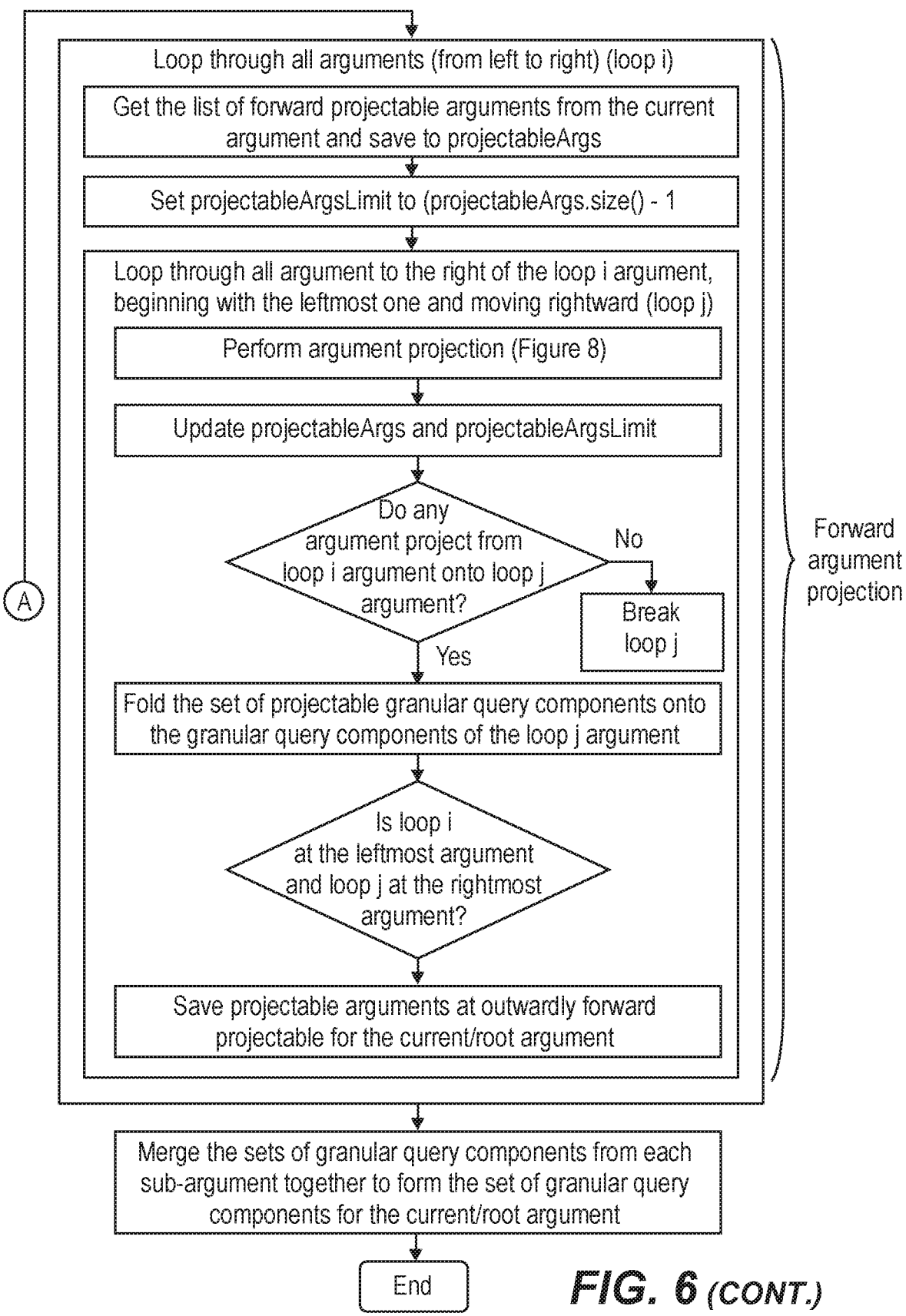

An argument can alternatively be marked as having its sub-arguments splittable. An example algorithm for processing an argument with splittable sub-arguments is illustrated in FIG. 6. An argument should be marked as such in the argument tree for compound entities of the same type. For example, the countries China and Japan in the query "What is the population and area of China and Japan?" could be sub-arguments of a placeholder node representing the countries, with the node marked as splittable.

When an argument with splittable sub-arguments is processed, each of its sub-arguments is processed first using the process illustrated in FIG. 4, as is the case for all types of arguments. As a result, each sub-argument has itself been resolved to a set of granular query components, in the form of a two-dimensional array of arguments.

A sub-argument may have descendant arguments that should project onto another sibling sub-argument. In one embodiment of the method, first backward projection is performed, followed by forward projection. In another embodiment, first forward projection is performed, followed by backward projection.

Each of the splittable sub-arguments can itself have sub-arguments that are projectable forward or backward onto zero or more of the other splittable sub-arguments. These projectable sub-arguments are usually in the form of sequences of one or more qualifiers. For example, in the query "What is the area of China and Japan in square miles?" the operation described below will allow the qualifier "in square miles" to project onto "China", even though it is a descendant only of "Japan" in terms of the argument tree.

Backward argument projection begins by looping through all sub-arguments beginning with the rightmost argument and moving leftward (loop i in FIG. 6). For the current sub-argument we perform a search to find any outwardly backward projectable descendant arguments, saving the result in a variable called projectableArgs. This is an ordered set of qualifier arguments that could possibly project onto arguments to the left of the current argument in loop i. If no outwardly backward projectable arguments exists that are immediately associated with the sub-argument of loop i, a deep search is performed, by checking that argument's rightmost sub-argument, and so on. If backward projectable descendant arguments do not exist, then we proceed to the next iteration of loop i. Otherwise, we define a variable called projectableArgsLimit and initialize it to a value of zero (initially referring to the leftmost possible projectable argument).

Next, we loop through all sub-arguments to the left of the current argument of loop i, beginning with the argument immediately to the left of the current argument of loop i. Then argument projection is performed, to determine which possibly projectable arguments from the current argument of loop i should project onto the current argument of loop j. This process is illustrated in FIG. 8, and will be described in further detail below.

Figure 8:
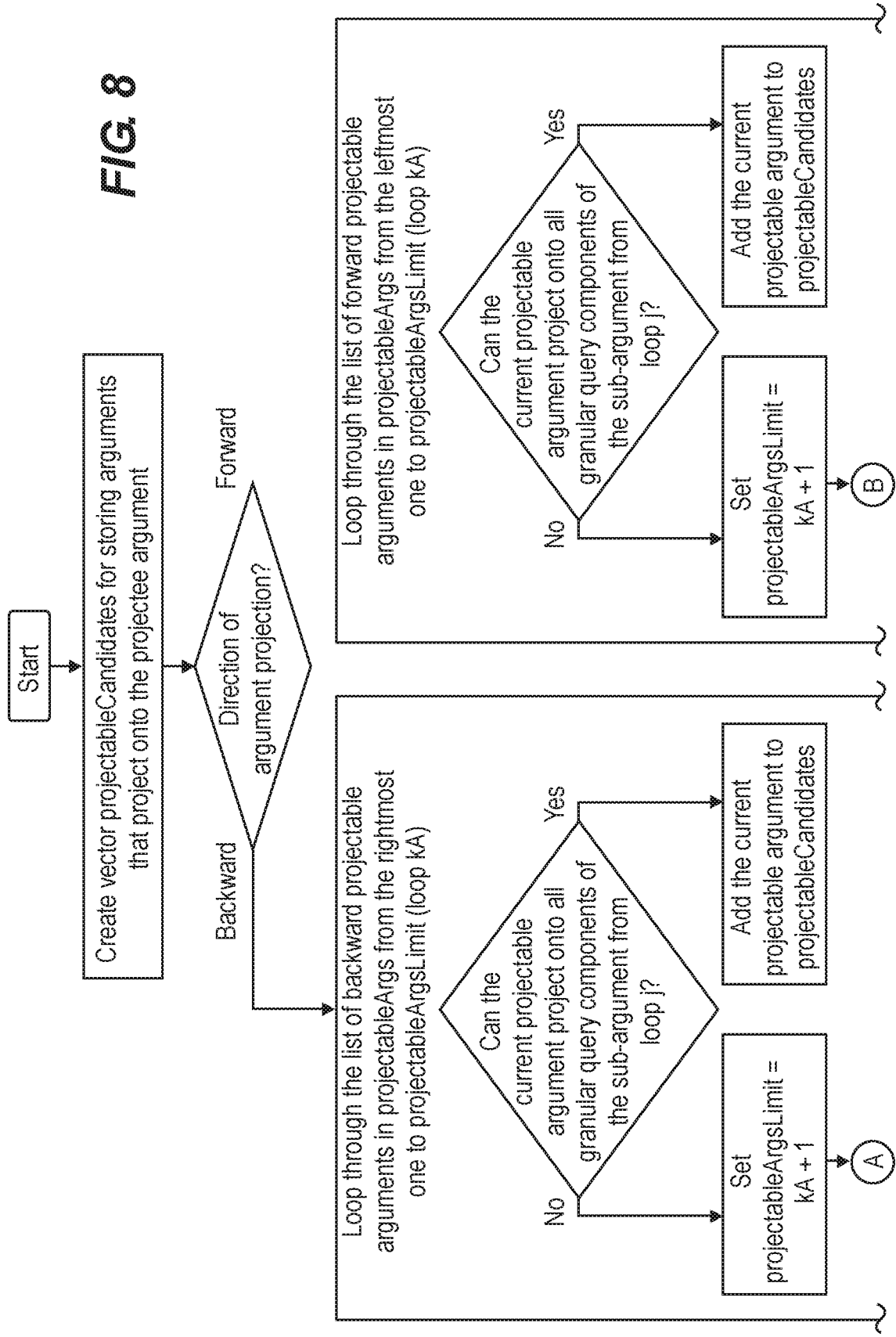
FIG. 8 illustrates a flowchart of an example algorithm for determining and performing argument projection from one argument to another.
Figure 8:
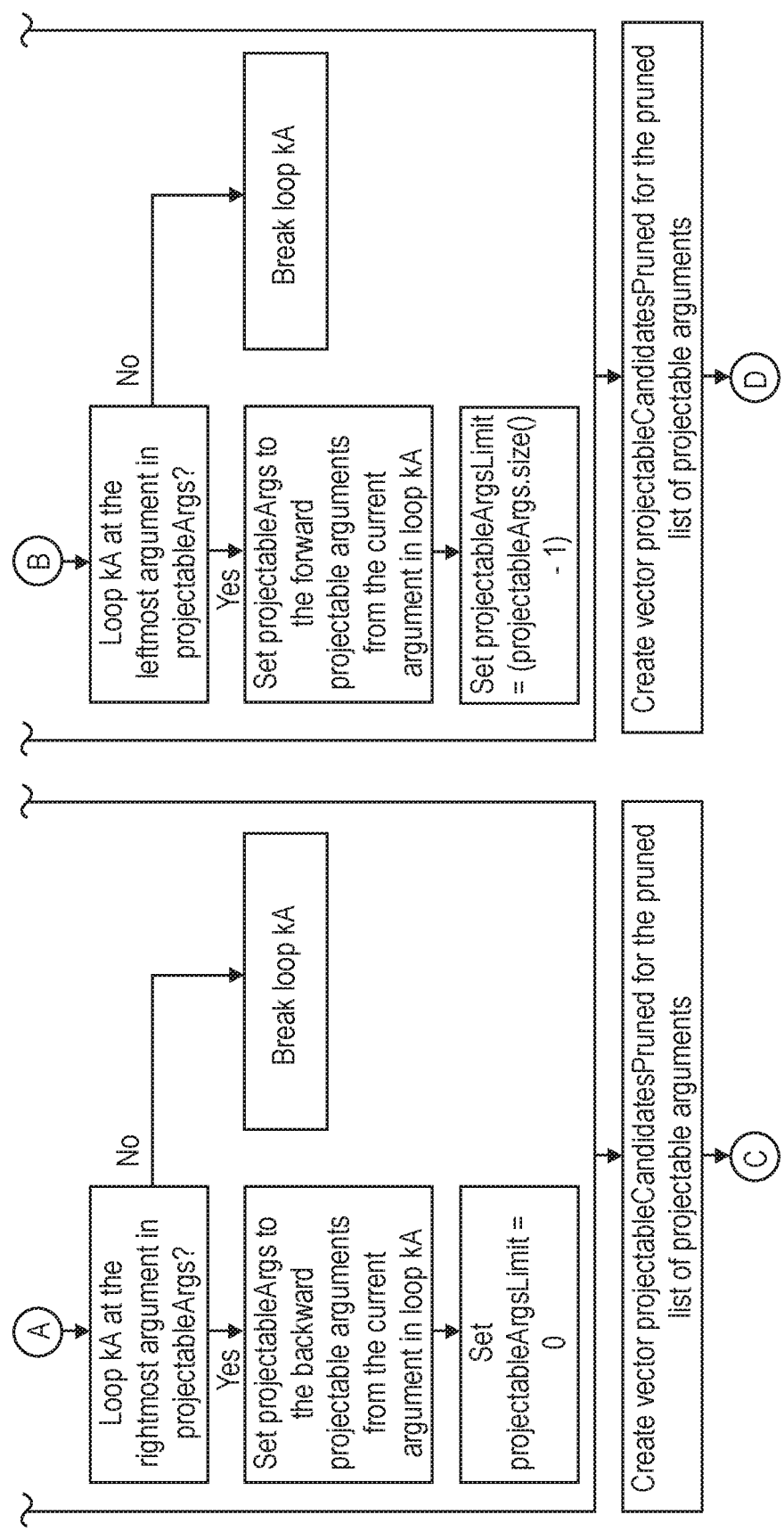
Figure 8:
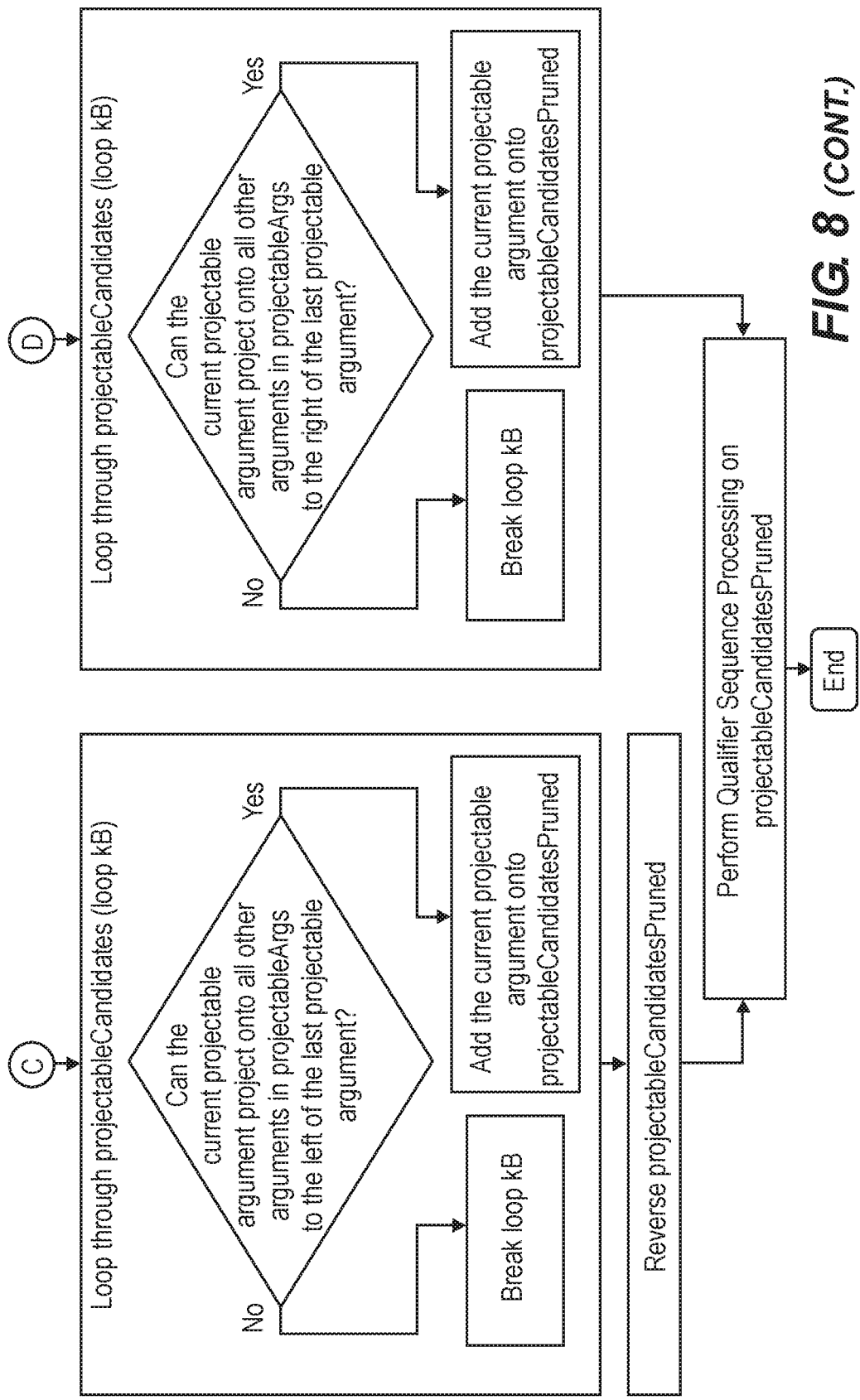

Next the variables projectableArgs and projectableArgsLimit are updated based on the result of calling the functionality illustrated in FIG. 8. If there are no arguments that should project onto the current argument of loop j, then loop j exits. If there are indeed arguments that should project onto the current argument of loop j, then the set of granular query components representing these arguments is folded onto the granular query components representing the current argument of loop j.

Next, if the current argument of loop i is the rightmost argument and the current argument of loop j is the leftmost argument, then the arguments that have been successfully projected onto the current argument of loop j are saved as being outwardly backward projectable for the current/root argument that is being processed.

Next forward projection occurs, which is the mirror image of backward projection. This is also illustrated in FIG. 6.

Once both forward and backward projection have completed, the main argument splitting process is performed. This process involves merging each sub-argument's set of granular query components into a single set of granular query components. Each sub-argument's set of granular query components may contain arguments from another sub-argument that have been projected via the process described above.

To illustrate the argument splitting process, suppose that argument $A_1$ has no sub-arguments. In this case the argument splitting process yields the following 2-dimensional list of resulting granular components:
( )(empty set)

In another example, suppose that argument $A_1$ has sub-arguments $B_1$, $B_2$ and $B_3$, which have been resolved as follows into their respective 2-dimensional lists of resulting granular components:
$B_1$: (($B_1$))
$B_2$: (($B_2$))
$B_3$: (($B_3$))

Then the resulting set of granular query components would be:
(($B_1$), ($B_2$), ($B_3$))

In yet another example, suppose that argument $A_1$ has sub-arguments $B_1$, $B_2$ and $B_3$, which have been resolved as follows into their respective 2-dimensional lists of resulting granular components:
$B_1$: (($B_1$, $C_1$, $C_2$), ($B_1$, $D_1$, $D_2$))
$B_2$: (($B_2$, $E_1$), ($B_2$, $F_1$))
$B_3$: (($B_3$))

Then the resulting set of granular query components would be:
(($B_1$, $C_1$, $C_2$), ($B_1$, $D_1$, $D_2$), ($B_2$, $E_1$), ($B_2$, $F_1$), ($B_3$))

The process of determining which outwardly projectable arguments of one argument should project onto another argument was mentioned above, and will be described here. This process is illustrated in FIG. 8.

The first step of the process is to create a vector called projectableCandidates that might project onto the projectee argument.

The subsequent behavior depends on whether backward or forward projection is occurring. For the case of backward projection, we loop through the list of outwardly projectable arguments (projectableArgs) beginning with the rightmost one until projectableArgsLimit is reached (loop kA).

Next we check whether each granular query component of the current argument of loop kA can project onto each granular query component of the projectee argument. This check is done based on the validity rules of the domain. If the current argument of loop kA can project onto the projectee argument, then it is appended to projectableCandidates and the next iteration of loop kA begins.

If the current argument of loop kA cannot project, then projectableArgsLimit is set to the current value of the kA iterator plus one.

This is because if one projectable argument cannot project backward, then all of the other projectable arguments to the left should not project either. This can be illustrated with the following example natural language query: "what is the population and area in 2000 in square miles of Japan." In this case "in square miles" cannot project onto "population" because the qualifier and attribute are incompatible with each other (this would need to be defined in the validity rules). As a result, "in 2000" should not project either. Even though it would otherwise be projectable onto "population", it is to the left of an outwardly projectable candidate which cannot project. Therefore, it is prevented from projecting.

We also set the limit projectableArgsLimit such that iteration is limited to the argument immediately to the right of the argument of loop kA. This is to prevent an argument from loop kA from projecting onto another argument in loop j of FIG. 6 that is to the left of another argument of loop j of FIG. 6 onto which it does not project.

If the current argument of loop kA does not project and if the current argument of loop kA in FIG. 8 is not the rightmost argument of projectableArgs, then loop kA is exited. If the current argument of loop kA is the rightmost argument of projectableArgs, then we perform a deep search on the current argument of loop kA to check if it has any outwardly backward projectable argument, or if not, if it's rightmost sub-argument has any outwardly backward projectable arguments, and so on.

For example, take the following query: "who won the most gold medals in the winter Olympics and silver medals in the winter Olympics and in the Summer Olympics of 1948". The node representing "silver medals" has backward projectable arguments ((Olympics, winter), (Olympics, summer, 1948)). Neither of these can project onto "gold medals" because of its child arguments "winter" and "Olympics". Instead of stopping there, we see if the rightmost backward projectable argument ("in the Summer Olympics of 1948") has any backward projectable arguments. Indeed it has one: ((1948)). This can project onto ((gold, winter, Olympics)) so it ends up projecting there. This jumping through multiple levels also facilitates the case where extra levels of indirection are present in the argument tree, in particular with dummy/placeholder arguments.

If in the case where the rightmost argument of loop kA does not project and if outwardly backward projectable arguments are found during the deep search for child outwardly projectable arguments, then projectableArgs is cleared, populated with the newly found outwardly backward projectable arguments, and projectableArgsLimit is set to a value of 0. Loop kA continues, beginning with the rightmost argument of the updated projectableArgs vector.

Once loop kA exits, then a vector called projectableCandidatesPruned is allocated, for storing a pruned list of projectable arguments. This list must be pruned by checking whether each projectable candidate found in loop kA can project onto the projectable arguments that were rejected. For example, take the query "What is the area of Japan in 2000 and China in 1800 in square kilometers and in 1900 in square miles?" In this query "in square miles" can project onto "Japan". However, "in 1900" does not project onto "Japan" because "Japan" already has a year argument. So "in square miles" is the only projectable candidate since we stop checking as soon as one argument does not project. However, the projectability of "in square miles" needs to be checked against all of the projectable arguments from the list that cannot project: ("in 1900", "in square kilometers", "in 1800"). Since "in square miles" does not project onto "in square kilometers" then it is prevented from projecting onto "Japan". In other words, "in square miles" is interpreted as applying only to "China." Also, in the case where there are multiple projectable candidates, we stop checking leftward once a candidate is found to not be projectable onto the rejected projectable arguments. If an argument in projectableCandidates can project onto each of the rejected arguments from look kA, it is added to projectableCandidatesPruned. Otherwise, the argument is not added to projectableCandidatesPruned.

Next the pruned list of projectable arguments is reversed (for backward projection only; for forward projection the list is kept as is) to ensure that the result maintains the natural argument order from the query.

Next, the pruned list of projectable arguments is processed into a set of granular query components. This is done by recursively calling the qualifier sequence processing operation illustrated in FIG. 7 (described below).

Finally, the set of granular query components and the updated values of projectableArgs and projectableArgsLimit are returned.

Sub-Arguments Forming a Sequence of Qualifiers

An argument can alternatively be marked as having its sub-arguments representing a sequence of qualifiers. Natural language queries can also consist of lists of qualifiers, which are often optional (in the sense that the query is grammatically sound without the qualifiers, although the meaning may be different). For example, the query "How many goals did the New York Rangers have in 2015, 2016 and 2017?" requests 3 granular query components:
  1. (goals, New York Rangers, 2015)
  2. (goals, New York Rangers, 2016)
  3. (goals, New York Rangers, 2017)

In this particular case, the number of granular query components requested is equal to the number of qualifier arguments in the query. This is not always the case, however, as shown in the example "How many goals did the New York Rangers have in 2015 short handed at home?" There are again 3 qualifiers, but now none of them are mutually exclusive to each other (according to the rules of validity for the domain), and as a result the query has only 1 granular query component:
  1. (goals, New York Rangers, 2015, short handed, at home)

In general a list of qualifiers does not need to be either entirely mutually exclusive or entirely non-mutually exclusive. The list can consist of combinations of both mutually exclusive and non-mutually exclusive qualifiers, appearing in various sequences (with the exact sequence often affecting the result). For example, the query "How many goals did the New York Rangers have in 2015 and in 2016 short handed and in 2017 in a power play?" includes 5 qualifiers and the query resolves to 3 granular query components:
  1. (goals, New York Rangers, 2015, short handed)
  2. (goals, New York Rangers, 2016, short handed)
  3. (goals, New York Rangers, 2017, power play)

The grouping logic for qualifiers may use different approaches in different embodiments to accomplish the grouping.

One embodiment of the grouping logic is now described. The grouping logic starts by turning the first qualifier argument into a one-argument granular query component. It then proceeds in an iterative manner over the rest of the qualifiers, determining for each qualifier not yet processed whether it can be added onto each of the pre-existing granular query components, with their validity preserved. Where adding the current (not-yet-processed) qualifier argument onto an existing granular query component yields a valid granular query component (i.e., the granular component remains valid after the qualifier argument is appended onto it), it is merged into that granular query component; where adding the current qualifier onto an existing granular query component yields an invalid granular query component, that existing qualifier is copied into a new granular query component containing the arguments of the existing granular query component which form a valid query component in combination with current, and the current qualifier is added into it.

For purposes of explanation, a shorthand notation involving symbols made of a letter and a number, such as "a1", "a2" and "c2", is used below to describe the behavior of this embodiment on an example. Symbols that use the same letter represent qualifiers that are form an invalid granular query component when joined together, such as two years (e.g., 2000 and 2010). Symbols with different letters are assumed to be different types that form a valid granular query component when joined together. Further, for each letter different numbers will be assigned to different qualifiers that are members of the class. For example, if letter "a" refers to the object type "Years", then "2000" and "2010" may be written using shorthand symbols "a1" and "a2". The following general rule models granular query component validity in terms of this shorthand notation: two symbols using the same letter but different numbers cannot form a valid granular query component when joined together; whereas symbols with different letters can be combined into a valid granular query component. It is appreciated that this notation is convenient for purposes of explanation but that it comes with limitations not inherent in actual embodiments. Thus, in this disclosure, although examples showing the grouping logic in action are provided in terms of the explanatory shorthand notation, shorthand notation does not capture the full complexity of which the grouping logic is capable.

As a first example (given in the shorthand notation), the sequence a1 b1 b2 of qualifiers can be evaluated as follows by the grouping logic as follows:

a1 b1 b2

→(a1, b1) b2 [To begin, a1 and b1 are compared, and can be joined together into a valid granular query component, so are combined into the single granular query component (a1, b1); in the meantime, element b2 is not yet processed.]

→(a1, b1), (a1, b2) [The current element, b2, cannot be appended onto the granular component (a1, b1) while preserving its validity because it is not valid in combination b1, which is already within the granular component, so a second granular component is formed containing a1 (onto which a valid granular query component together with b2 can be formed), and then b2 is combined into that second granular component, producing the second distinct granular component (a1, b2), in addition to (a1, b1).]

Figure 9:
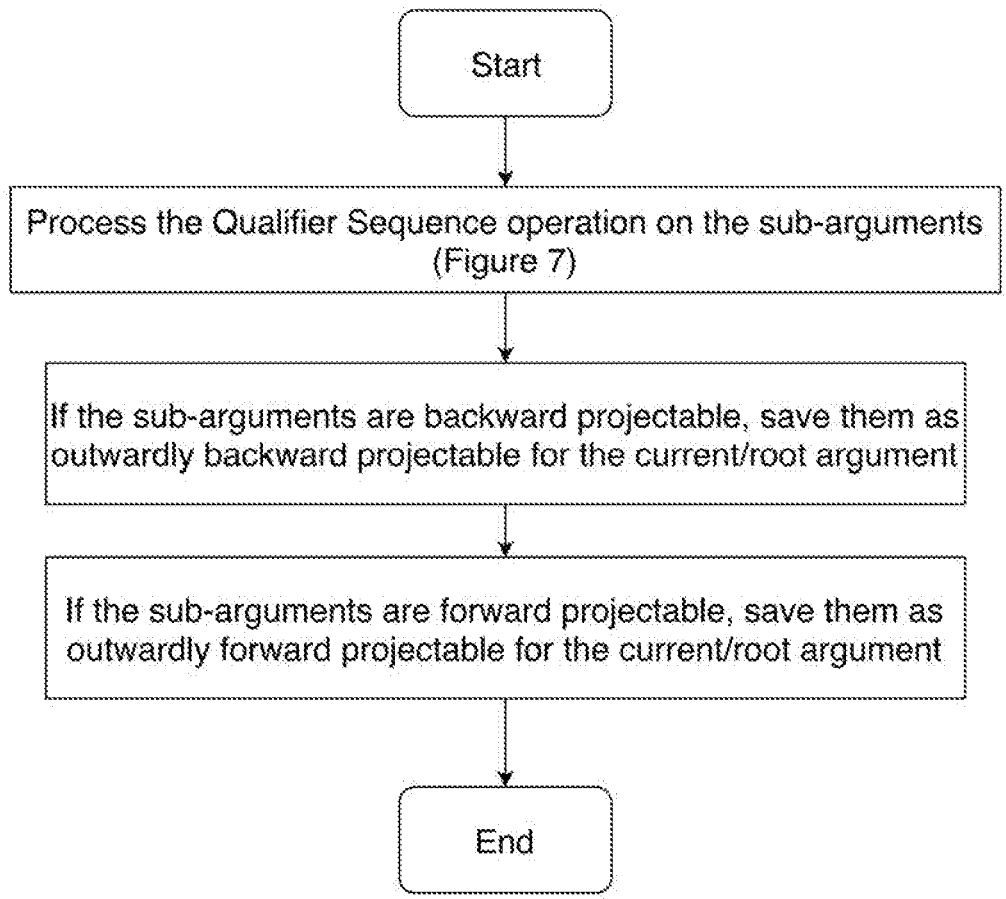
FIG. 9 illustrates a flowchart of an example algorithm for processing a set of sub-arguments in the form of a sequence of qualifiers.

The qualifier sequence branch processing algorithm is illustrated in FIG. 9. First, the qualifier sequence operation is performed on the sub-arguments, which is illustrated in FIG. 7.

Figure 7:
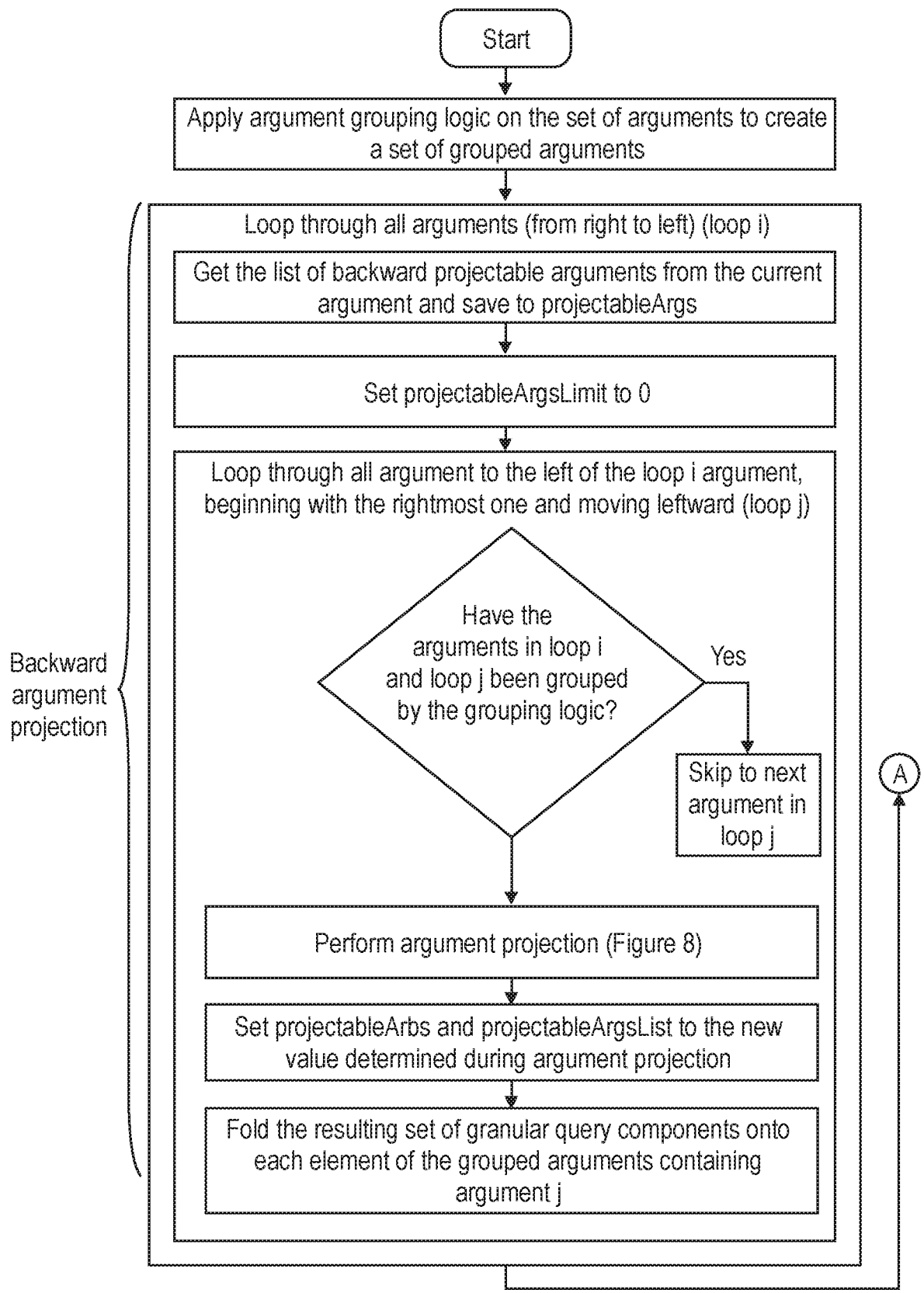
FIG. 7 illustrates a flowchart of an example algorithm for processing a sequence of qualifiers.
Figure 7:
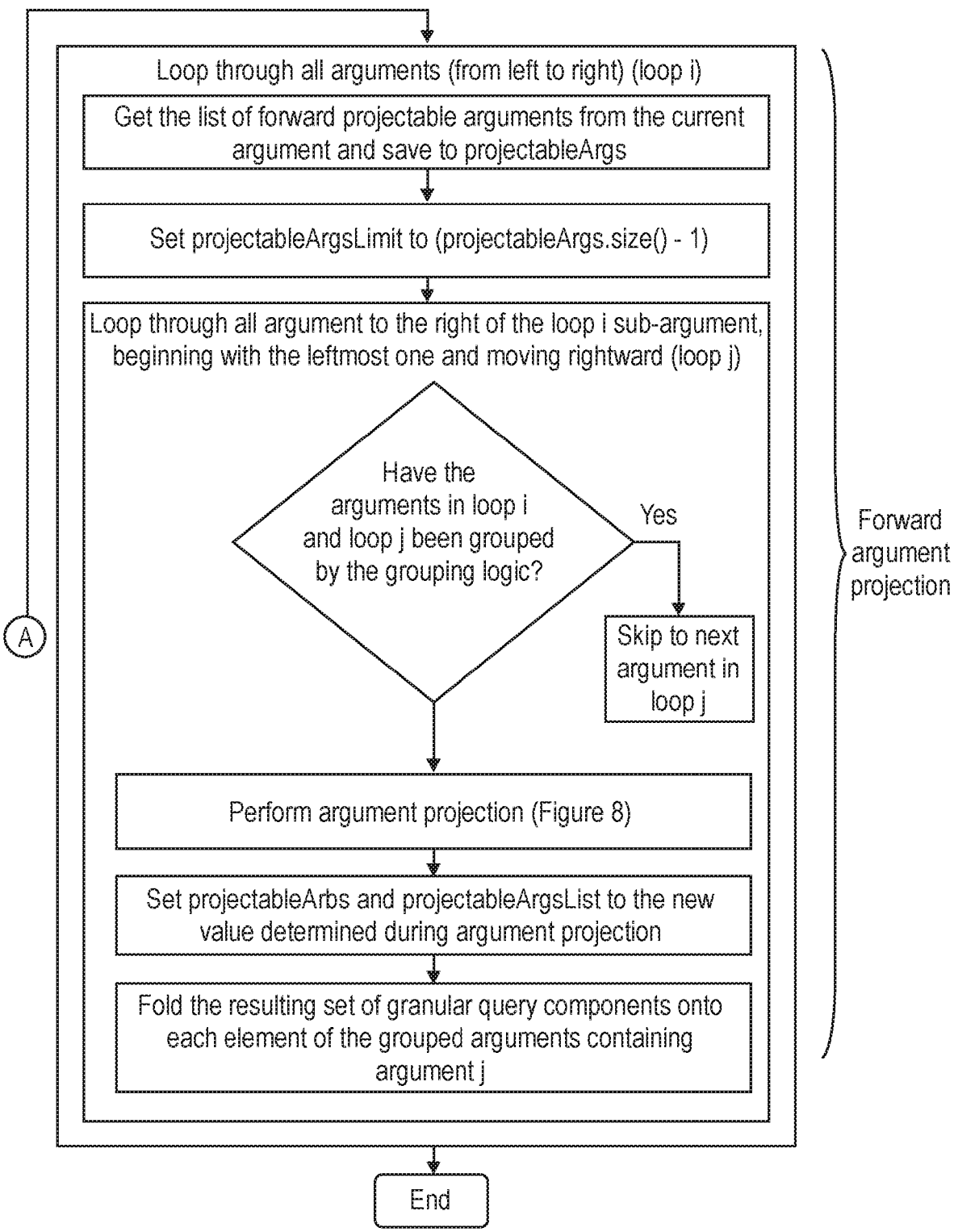

Referring the FIG. 7, the first step is to apply the grouping logic on the sub-arguments, to create a set of grouped arguments.

If none of the sub-arguments have any sub-arguments themselves, then the process is completed for the current argument. The set of granular query components for the current argument is determined based on the qualifier grouping logic mentioned above. In the general case, however, sub-arguments can have outwardly projectable arguments. The set of outwardly projectable arguments is determined either during the processing of a sequence of qualifiers, or during the processing of an argument with splittable sub-argument.

The inner projection process on a sequence of qualifiers is performed twice: once in the backward direction and once in the forward direction. In one embodiment, backward projection is performed first, followed by forward projection.

In the backward projection process, we start with the rightmost qualifier sub-argument, moving leftward (loop i). This sub-argument is checked to see whether it has any outwardly backward projectable arguments. A deep search is performed, such that if the current sub-argument of loop i does not have any outwardly backward projectable arguments, the rightmost sub-argument of the current sub-argument of loop i is checked, and so on. If one or more outwardly backward projectable arguments are found, then these projectable arguments are checked to see whether they should project onto any other qualifier sub-arguments belonging to the current/root argument that are to the left. These possibly projectable arguments are stored in a vector called projectableArgs. A limit value called projectableArgsLimit that will be used to constrain the looping through the set of backwards projectable arguments is initially set to 0, corresponding to the leftmost outwardly projectable argument. We move leftward, starting with the argument immediately to the left of the argument of loop i (loop j). When determining whether any of these outwardly projectable arguments should project onto another argument to the left, we also check whether the current arguments of loop i and loop j have been combined together in any of the granular components determined by the grouping logic. If they have been combined together in any granular component, then we move onto the next argument in loop j (in such cases, the qualifiers, including all of their sub-arguments, have already been merged together in at least some of the groupings, so projectable arguments should not be further projected between them). If the current qualifiers being checked in loop i and loop j have not been combined by the grouping logic, then the outwardly projectable arguments determined above are analyzed to see if they may project onto the argument of loop j. This is done using the process illustrated in FIG. 8 (previously described above in the description of the argument splitting branch).

The values for projectableArgs and projectableArgsLimit in FIG. 7 are then updated based on the values returned by the process of FIG. 8.

The resulting set of projecting granular components is folded onto the granular components of the argument of loop j.

Loop j is completed and loop i is completed.

Next we perform forward argument projection, which is the mirror image of the above.

Once the grouping logic and inner projection processes have been performed on the list of qualifiers, the result is saved as the granular set of arguments for the current argument.

Referring back to FIG. 9, for an argument with sub-arguments marked as being a sequence of qualifier arguments, the set of qualifier sub-arguments that are forward projectable are denoted as being outwardly forward projectable for the current argument. The set of qualifier sub-arguments that are backward projectable are denoted as being outwardly backward projectable for the current argument.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 3A:
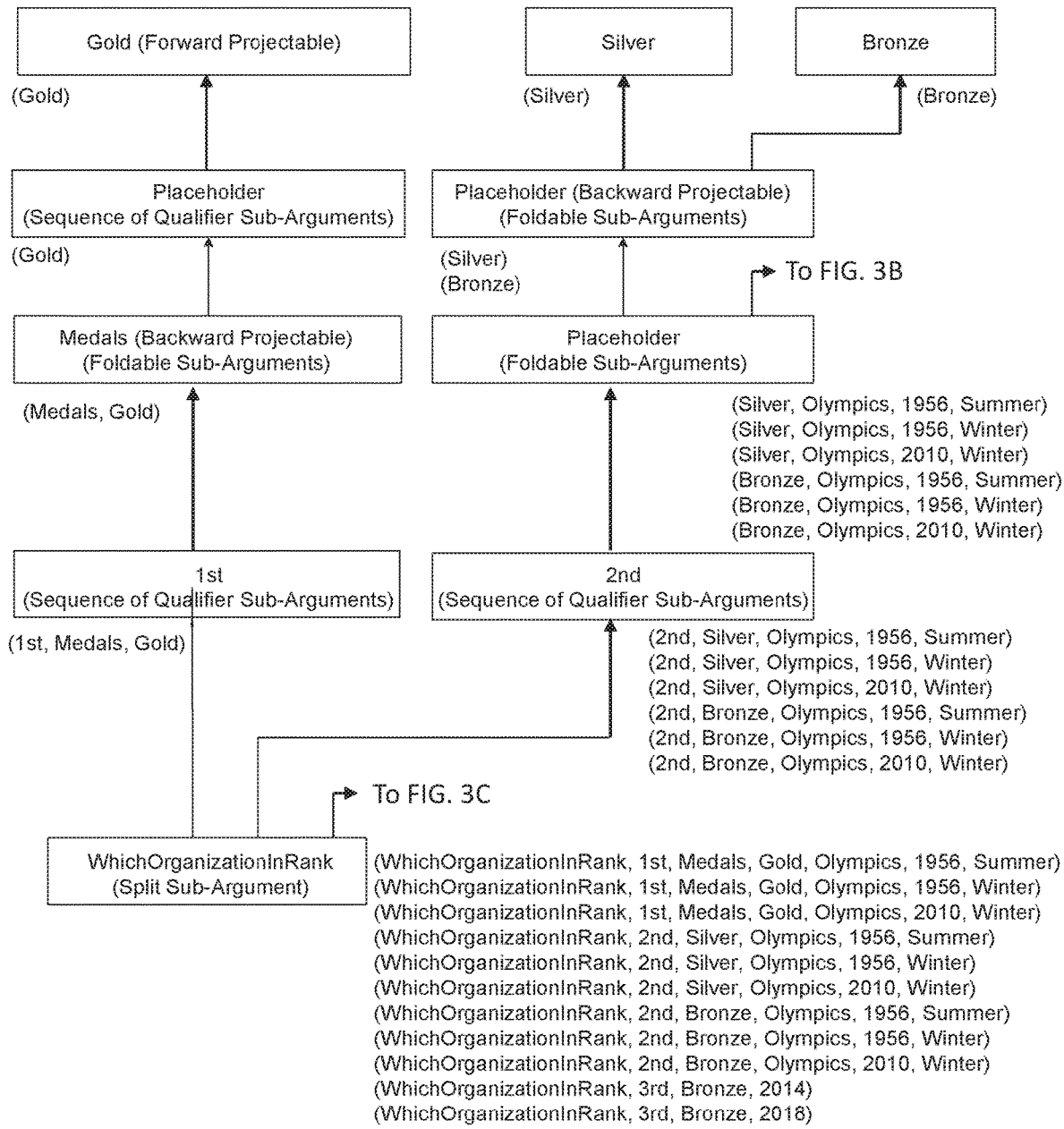
FIG. 3A illustrates a portion of an example of an argument tree for a particular query.
Figure 3B:
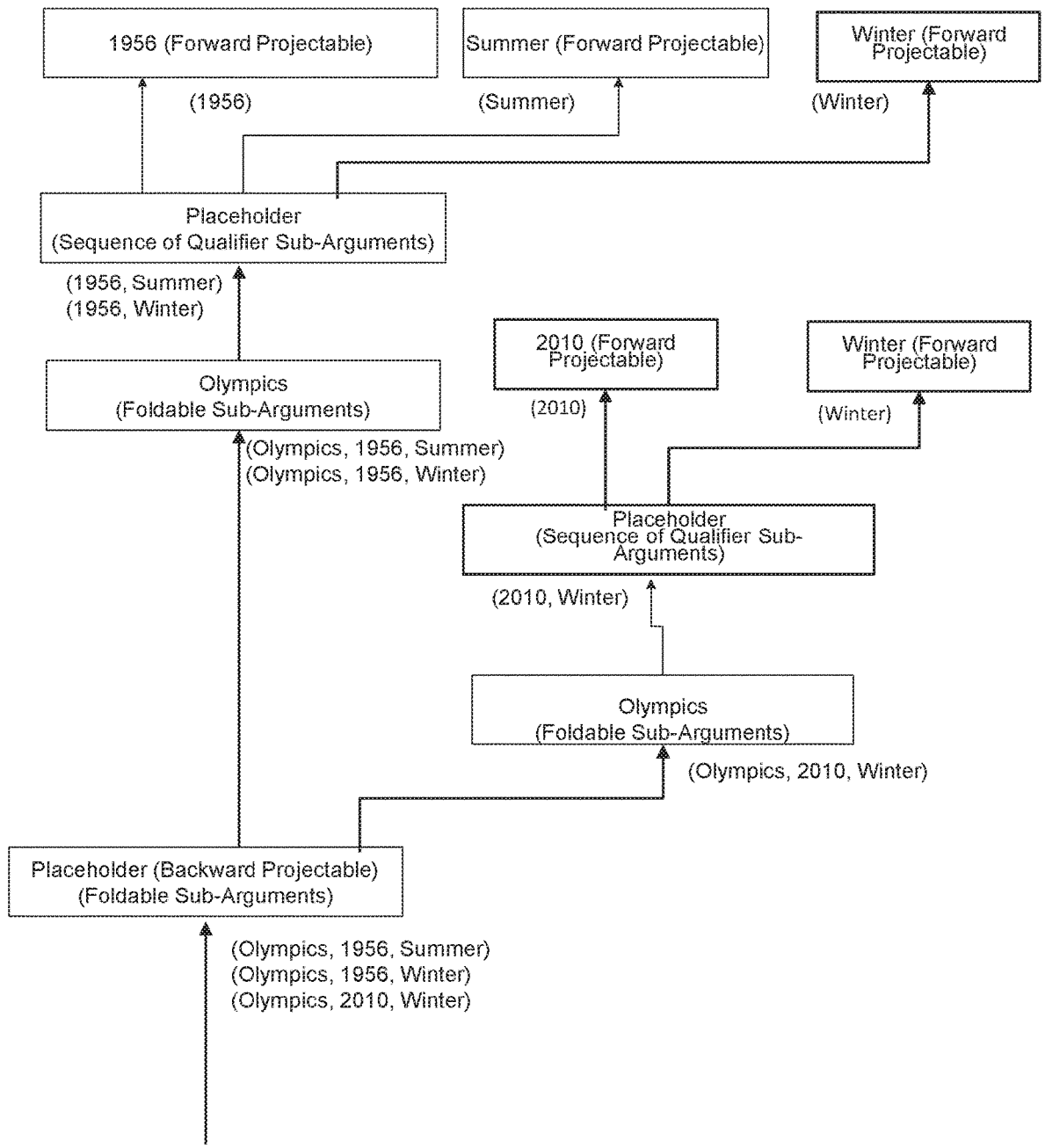
FIG. 3B illustrates another portion of an example of an argument tree for a particular query.
Figure 3C:
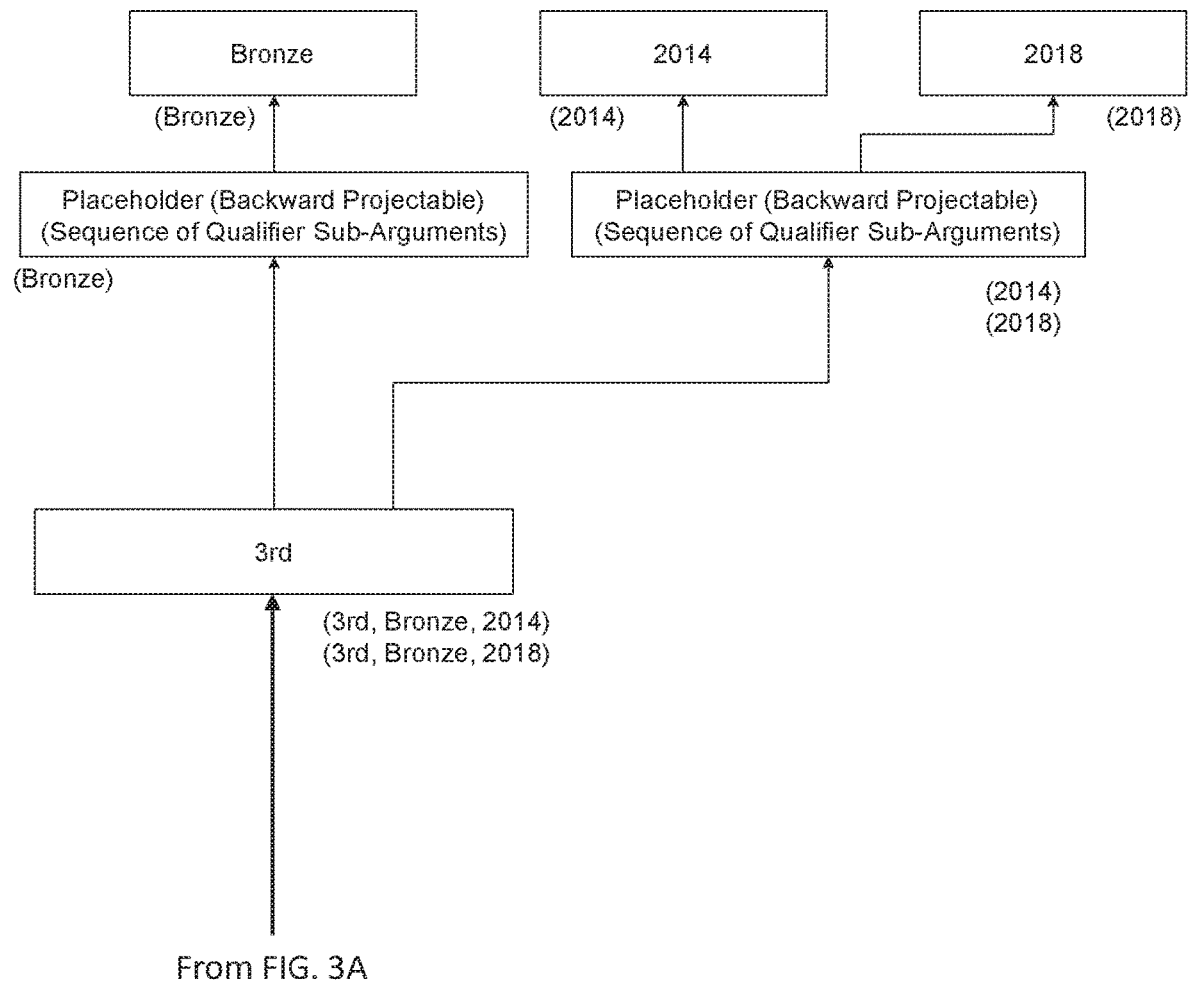
FIG. 3C illustrates a final portion of an example of an argument tree for a particular query.

FIGS. 3A, 3B and 3C (collectively "FIG. 3") illustrate an example of an argument tree 300 for a particular domain based on the following complex query: "Who ranked 1st in gold medals and 2nd in silvers and bronzes in the 1956 summer and winter Olympics and 2010 winter Olympics and 3rd in bronzes in 2014 and 2018?" One of skill in the art will appreciate that there can be multiple ways of representing an argument tree for the same query. For example, a dummy argument node can be added in between an argument without any siblings and its parent, without affecting the final output. In some cases, a query can have multiple logical interpretations due to language ambiguity each resulting in a different argument tree and a different final output.

The presence of many placeholder nodes can be noted. These are often used to denote nodes where multiple sub-arguments could exist for queries of a similar form, but may not exist in all queries. For example, the fragment "2010 winter Olympics" has a placeholder argument between the pre-qualifiers "2010" and "winter" and the object "Olympics" because a query in this form could also have post-qualifiers associated with it, as is the case for the fragment "2010 winter Olympics in Vancouver."

Multiple placeholder arguments should be allowed to exist in a single granular query component, as specified in the validity rules for the domain. In other words, the addition of one or more placeholder arguments to a granular query component should not render that query component invalid.

The domain for this query is retrieving information about Olympic medal standings, and in particular, one of the requirements is identifying organizations holding specified medal ranks in Olympic instances. This particular query requests many different granular items, which the invention will help resolve. The granular set of query components corresponding to this query is as follows:

1. (WhichOrganizationInRank, $1^{st}$, Gold, 1956, Summer, Olympics)
2. (WhichOrganizationInRank, $1^{st}$, Gold, 1956, Winter, Olympics)
3. (WhichOrganizationInRank, $1^{st}$, Gold, 2010, Winter, Olympics)
4. (WhichOrganizationInRank, $2^{nd}$, Silver, 1956, Summer, Olympics)
5. (WhichOrganizationInRank, $2^{nd}$, Silver, 1956, Winter, Olympics)
6. (WhichOrganizationInRank, $2^{nd}$, Silver, 2010, Winter, Olympics)
7. (WhichOrganizationInRank, $2^{nd}$, Bronze, 1956, Summer, Olympics)
8. (WhichOrganizationInRank, $2^{nd}$, Bronze, 1956, Winter, Olympics)
9. (WhichOrganizationInRank, $2^{nd}$, Bronze, 2010, Winter, Olympics)
10. (WhichOrganizationInRank, $3^{rd}$, Bronze, 2014)
11. (WhichOrganizationInRank, $3^{rd}$, Bronze, 2018)

Specific data classes should be defined for each type of data corresponding to this domain. In particular, the following data classes are used for the example query above:
QueryType
This is used to identify query sub-types for the sub-domain for retrieving information about Olympic medal standings. For the example, the sub-type is identifying organizations holding specified medal ranks in Olympic instances. An example of another sub-type is a query requesting the rank of a particular organization (for example in the query "what was the Rank of Canada in the last Olympics?").
Rank
This is an Olympics standings rank, for example, first or second.
Year
This is the year of an Olympiad, for example 1956 or 2010.
Season
This is an Olympic season: summer or winter.
SortMethod
This is a medal standings sort method: for example by gold medals or by silver medals.
NoDataOlympics
This is a dummy data type for the keyword "Olympics". This will be used to properly control argument folding and is described in more detail below.
NoDataMedal
This is a dummy data type for the keyword "Medals". This will be used to properly control argument folding and is described in more detail below.

The purpose of the NoDataOlympics and NoDataMedal is to control the argument grouping behavior. For example, in the phrase "in the 1956 Olympics and in the summer Olympics" the arguments "1956" and "summer" should be kept in separate granular query components. Assuming that this phrase is marked as forming a sequence of qualifiers, if placeholder arguments were used instead for "Olympics" then these arguments would be incorrectly grouped together. These special arguments allow the grouping to be properly controlled.

The next step is to define a function that implements the validity rules for the domain. The input to this function is an array of arguments of the types defined above. The output is a Boolean value indicating whether the items in the input array form a valid granular query. That is, the Boolean value is false if the query cannot be performed because it doesn't include all the necessary elements or because it includes contradictory arguments. For example, if the input is a year in which the Olympics didn't occur, then the granular query is invalid because no possible results can be found. Likewise, if the granular query includes elements that aren't mutually exclusive then it is invalid. The function can optionally check whether any required arguments are missing. In this case, if some required components are missing, the validity result of the function should be false. For example, if the set of arguments is:

(QueryType=WhichOrganizationInRank, Rank=$1^{st}$, SortMethod=Gold, Year=1956, Season=summer, NoDataOlympics)

then the function should return true. This is because all of the elements of the input array are mutually exclusive (and all required elements are present). On the other hand, if the set of arguments is:

(Rank=$1^{st}$, SortMethod=Gold, Year=1956, Season=summer, NoDataOlympics)

then the function should return true if we are not checking that all required components are present, and false otherwise. This is because all of the elements of the input are again mutually exclusive, but the required QueryType item is missing. Likewise, if the set of arguments is:

(Rank=$1^{st}$, SortMethod=, Year=1956, Season=summer, Season=winter, NoDataOlympics)

then the function should return false regardless of whether we are checking for required components. This is because there are two season items present. A properly defined implementation of the validity function should not allow multiple season arguments for a single granular query component.

This Boolean function is relied upon heavily by the framework both for granularizing the query and for validating the resulting set of granular components.

Each argument is comprised of the following:
The type and data content of the argument
An array of sub-arguments (optional)
A flag indicating whether the sub-arguments are foldable, splittable, or a sequence of qualifiers (optional)
A direction of projectability (forward or backward) (optional)

The query is resolved into granular query components by calling the process of FIG. 4 (described above) on the root argument. This function calls itself recursively on all sub-arguments using a depth-first search algorithm. Each argument in the tree is processed in this manner, with the functionality yielding the following for each argument:
A 2-dimensional vector of arguments representing the granularized query components.
A list of outwardly backward projectable sub-arguments.
A list of outwardly forward projectable sub-arguments.

When calling the functionality of FIG. 4 on the root argument, first the functionality of FIG. 4 would be performed on each of the sub-arguments in a depth-first manner. Next, since the sub-arguments of the root argument are flagged as split, the argument splitting illustrated in FIG. 6 would be performed on the sub-arguments. Then, the root argument itself (QueryType=WhichOrganizationlnRank) would be appended to each of the resulting granular query components. Finally, each resulting granular query component is validated using the validity functionality. In this case, each granular query component is verified to contain all required components.

The result of calling the functionality of FIG. 4 on the root argument is the final set of granularized query components. Each descendant argument will also have its own set of granularized query components. In the example argument tree of FIG. 3, the granular query components for each argument in the tree are specified.

As an example, the "Olympics" argument in the above example with its placeholder sub-argument have the sub-arguments "1956", "Summer" and "Winter" would produce the following:
Granularized query components: ((Olympics, 1956, Summer), (Olympics, 1956, Winter))
Outwardly backward projectable arguments: (( ))
Outwardly forward projectable arguments: (( ))

This argument does not have any direct sub-arguments that are projectable, thus both outwardly projectable argument vectors are empty. However, its placeholder sub-argument would have the "1956", "Summer" and "Winter" sub-arguments marked as outwardly forward projectable.

The "$2^{nd}$" argument) would produce the following from the functionality of FIG. 4:
Granularized query components: (($2^{nd}$, Silver, Olympics, 1956, Summer), ($2^{nd}$, Silver, Olympics, 1956, Winter), ($2^{nd}$, Silver, Olympics, 2010, Winter), ($2^{nd}$, Bronze, Olympics, 1956, Summer), ($2^{nd}$, Bronze, Olympics, 1956, Winter), ($2^{nd}$ Bronze, Olympics, 2010, Winter))
Backward projectable arguments: ( )
Forward projectable arguments: (( ))

What is claimed is:

1. A method for processing a natural language query, the method comprising a hardware processor:
receiving the natural language query that includes a plurality of arguments requesting a corresponding plurality of pieces of information;
parsing the query extracting the plurality of arguments;
constructing a hierarchical argument tree representing the substance and structure of the query from the extracted plurality of arguments, including deriving how each of the extracted plurality of arguments are to be combined with one another; and
processing the hierarchical argument tree in view of: (a) the substance and structure of the query and (b) how the extracted plurality of arguments are to be combined, deriving a plurality of granular query components that collectively request and correspond to the plurality of pieces of information.

2. The method of claim 1, wherein deriving how each of the extracted plurality of arguments should be combined with one another includes identifying if an argument has a sub-argument which is at least one of:
foldable;
splittable; or
a sequence of qualifier arguments.

3. The method of claim 1, wherein constructing the hierarchical argument tree comprises projecting a plurality of qualifiers including forward projecting a qualifier onto one of the extracted plurality of arguments.

4. The method of claim 1, wherein constructing the hierarchical argument tree comprises projecting a plurality of qualifiers including backward projecting a qualifier onto one of the extracted plurality of arguments.

5. The method of claim 1 further comprising accessing a projection rule defining that qualifiers are checked for backward projection prior to being checked for forward projection; and
wherein processing the hierarchical argument tree comprising applying the projection rule to the hierarchical argument tree.

6. The method of claim 1, wherein the extracted plurality of arguments include at least one of:
objects; or
attributes.

7. A method comprising:
receiving a query that includes a plurality of arguments requesting a plurality of pieces of information;
determining a domain of knowledge associated with the query;
a hardware processor parsing the query extracting the plurality of arguments;
the hardware processor constructing a hierarchical argument tree representing the substance and structure of the query from the extracted plurality of arguments, including deriving how each of the extracted plurality of arguments are to be combined with one another;
accessing validity rules defined for the domain;
the hardware processor processing the hierarchical argument tree producing a set of granular query components, including:
folding and splitting the extracted plurality of arguments;
executing grouping logic for lists of arguments from among the extracted plurality of arguments; and
projecting arguments in the extracted plurality of arguments onto other arguments in the extracted plurality of arguments; and
validating each granular query component using the validity rules.

8. The method of claim 7, wherein projecting arguments onto other arguments comprises applying projection rules specifying that arguments are checked for backward projection prior to being checked for forward projection.

9. The method of claim 7, wherein projecting arguments onto other arguments comprises applying projection rules specifying that arguments are checked for forward projection prior to being checked for backward projection.

10. The method of claim 7, wherein a first projectable candidate and a second projectable candidate are identified for an argument, the first projectable candidate being intermediate within the text of the query the argument and the second projectable candidate.

11. The method of claim 10, wherein the second projectable candidate is determined to be actually projectable only if the first projectable candidate is actually projectable.

12. The method of claim 10, wherein the first projectable candidate is determined to be actually projectable regardless of whether the second projectable candidate is actually projectable.

13. A method performed by a hardware processor, comprising:
  receiving a query, the query referring to a plurality of arguments, and requesting a plurality of pieces of information;
  determining a domain of knowledge associated with the query;
  parsing the query to extract the plurality of arguments that form the query;
  based on the results of parsing, constructing an argument tree deriving how each of the plurality of arguments should be combined with other arguments from the plurality of arguments to form granular query components;
  accessing validity rules defined for the domain;
  processing the query, wherein processing the query includes:
    folding and splitting arguments;
    executing grouping logic for lists of arguments; and
    projecting arguments onto other arguments;
  producing a set of granular query components; and
  validating each granular query component using the validity rules, wherein validating each granular query component includes:
    validating each granular query component that includes more than one projectable argument, wherein validation of each granular query component includes determining that none of the more than one projectable arguments are mutually exclusive relative to other projectable arguments.

14. The method of claim 13, wherein any granular query component that is not validated is removed from the set of granular query components.

15. The method of claim 13 further comprising:
  after validation, performing a search of each granular query component within the domain and adding the results to a result set.

16. The method of claim 13 further comprising:
  sending the result set to the user that submitted the query.

17. The method of claim 13, wherein validation includes producing a Boolean value indicating whether the items in the granular query component forms a valid granular query.

18. The method of claim 17, wherein the Boolean value is false if the granular query component includes contradictory terms.

19. The method of claim 17, wherein the Boolean value is false if the granular query component fails to include all necessary elements to perform a search.

20. The method of claim 17, wherein the Boolean value is true if the granular query component includes terms that are all mutually exclusive relative to one another.

* * * * *